Patented Jan. 6, 1942

2,268,919

UNITED STATES PATENT OFFICE 2,268,919

POLYAZO DYESTUFFS AND PROCESS OF MAKING SAME

Walter Anderau, Basel, Switzerland, assignor to the firm Society of Chemical Industry in Basle, Basel, Switzerland No. 337,317. In Switzerland June 10, 1939

10 Claims. (Cl. 260—153)

It has been found that valuable polyazo dyestuffs may be obtained by coupling diazotized starting components with middle components, further diazotization and coupling with further middle and/or end components if, as starting components, aminosalicylic acids, as middle components, compounds of the general formula

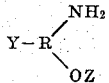

wherein R represents a benzene radical in which the substituents Y and OZ are placed in the para position to one another and the amino group stands in the ortho position to the group OZ, and wherein Z represents the radical of a low aliphatic fatty acid which is united to the O-atom by means of a chain carbon atom, wherein further Y represents an alkyl, an O-alkyl- or an O-aralkyl group, and finally, as end components, amino-naphthol sulfonic acids are chosen, which are united to a 1:3:5-triazine radical by means of their nitrogen atoms in the form of an imino group, the triazine radical containing at least once the radical of a para-aminoazo dyestuff as a substituent.

The aminosalicylic acids which serve as starting components may have the amino group, for example, in the para-position to the hydroxyl group and, if desired, may possess other substituents in addition, such as alkyl groups or halogens.

In the compounds of the above mentioned general formula, the group Z may be, for example, the radical of a fatty acid or of the functional derivatives thereof, such as esters or acid amides, so for instance the radical of acetic of propionic acid, Y may be a low molecular alkyl radical, such as the methyl radical, or an alkoxy group, such as the methoxy or ethoxy group, or an aralkoxy group, such as the group $C_6H_5CH_2$—O—.

The coupling of the diazotized aminosalicylic acids with the middle components takes place according to generally known methods, for example, in a weakly acid medium.

Instead of uniting diazotized aminosalicylic acids directly with the middle components of the structure above mentioned, it is also possible to insert another of the middle components known to azo chemistry between the aminosalicylic acids and the middle components above named, or between these middle components and the end components. Such a known middle component might be, for example, 1-aminonaphthalene-6- or -7-sulfonic acid.

The compounds which come into question for use as middle components and which have the general formula given above may be obtained by the usual methods. Those compounds in which Y stands for an O-alkyl or an O-aralkyl group may be advantageously prepared from nitrohydroquinone-alkyl or aralkyl-ethers by treating these ethers with catalysts of the Friedel-Crafts type, such as aluminium chloride, when the ether group standing in the ortho position to the nitro group is saponified, the resulting nitro compound is reduced to the corresponding amine from which, for example by condensation with chloracetic acid chloride, by means of the intermediate stage of the morpholone, the 1-amino-5-alkoxy- or -5-aralkoxy-2-phenoxy-acetic acid may be obtained.

As end components, such naphthol sulfonic acids which are capable of coupling may be used in carrying out the present process, whose structure is characterized by the presence of the 1:3:5-triazine ring, which ring contains the radical of a p-aminoazo dyestuff at least once as a substituent. These compounds are obtained, for example, by the condensation of cyanuric chloride with aminonaphthol sulfonic acids, aminoazo dyestuffs and other products containing amino groups. The method of preparing this type of compound is described in detail in U. S. A. Patents 1,625,530, 1,625,531 and 1,625,532.

The method of preparation of compounds which contain a ternary substituted 1:3:5-triazine ring depends on the property of cyanuric chloride, for example, to enter into reaction with amines which have an exchangeable hydrogen atom at the nitrogen atom, while splitting-off all 3 chlorine atoms, whereby in place of the chlorine atoms the substituents are united with the 1:3:5-triazine ring by means of their nitrogen atoms in the form of imino groups. Furthermore since the three chlorine atoms of the cyanuric chloride do not react with equal ease, the possibility exists of introducing different substituents by stages into the 1:3:5-triazine ring in the manner mentioned above. Thus, for instance, by stirring an aqueous suspension of 1 mol of cyanuric chloride with 1 mol of an amine containing an exchangeable hydrogen atom combined with its nitrogen atom, the first chlorine atom is brought into reaction at 15–20° C. By slightly increasing the temperature and adding sodium acetate (which binds the hydrochloric acid released during the action), the second chlorine atom of the cyanuric chloride may be replaced by a further molecule of the same or of a different amine. Finally, by heating under reflux with a further addition of sodium acetate, the third chlorine atom may be caused to enter into reaction with a third molecule of an amine in the same manner.

Particularly valuable products as regards shade and fastness properties are obtained by the use of those compounds as end components in which, in the condensation with cyanuric chloride, in addition to ammonia or aromatic amines, sulfonic acids of 1:8-aminonaphthol, such as 1-amino-8-hydroxynaphthalene-3:6-disulfonic acid, and p-aminoazo compounds are used, which have been prepared from diazotized aminosalicylic acids by coupling with amines, for example, aniline.

The products obtained are suitable for dyeing and printing the most varying materials. They are particularly suitable for the dyeing of cellulosic fibres, such as cotton, linen, regenerated cellulose in the form of rayon or staple fibre, and similar textile fibres. The fastness properties of the dyeings obtained may be improved by aftertreatment with agents yielding metals, particularly with copper salts, in the dyebath or in a fresh bath, in which case the dyeing process of U. S. A. Patents 2,148,659 and 2,185,905 may be used. It is especially possible to prepare very pure green dyeings of very good general fastness with the dyestuffs obtained by means of the present invention.

In many cases the dyestuffs obtained according to the present process may also be converted in substance into metal, particularly into copper and/or chromium compounds by known methods.

Example 1

1/10 mol of 4-amino-1-hydroxybenzene-2-carboxylic acid is dissolved in 400 parts of water and 25 parts by volume of concentrated hydrochloric acid and is then diazotized by means of 7 parts of sodium nitrite at 15° C. 1/10 mol of the sodium salt of 5-methoxy-1-amino-2-phenoxyacetic acid is then added. The excess of mineral acid is neutralized by addition of sodium acetate. Coupling is allowed to take place for 24 hours, after which the precipitate is filtered off.

The aminoazo dyestuff formed is dissolved in 400 parts of water at 50° C. and 25 parts by volume of caustic soda solution of 40% strength, ice is added until the temperature has been lowered to 0° C. and then 7 parts of sodium nitrite are added. 50 parts by volume of concentrated hydrochloric acid are then added and the mixture is stirred for 1 hour. The diazo compound formed is added to the ternary condensation product obtained from 1/10 mol of 1-amino-8-hydroxynaphthalene-3:6-disulfonic acid and 1/10 mol of cyanuric chloride, 1/10 mol of 4-amino-4'-hydroxy-3'-carboxyazobenzene and 1/10 mol of aniline. Next, 60 parts of soda are added, whereupon coupling to a green dyestuff takes place. This is separated by addition of common salt and heating.

The dyestuff of the probable formula

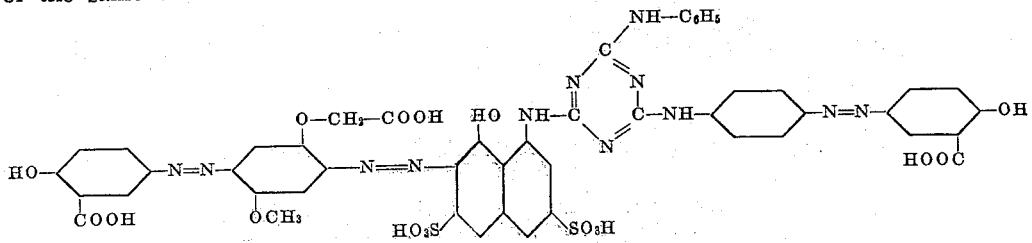

is a dark powder which dyes vegetable fibres in green shades. On aftertreatment with copper salts, the dyeings become purer and fast to light and washing.

Dyestuffs which yield similar green shades fast to light and washing when their dyeings on vegetable fibres are aftertreated with copper salts are obtained if the sodium salt of 5-methoxy-1-amino-2-phenoxyacetic acid be replaced by 1/10 mol of 6-methoxy-3-methyl-1-aminobenzene or 1-aminonaphthalene-6- or -7-sulfonic acid as first middle component, and, after further diazotization, 1/10 mol of the sodium salt of 5-phenyl-methoxy-1-amino-2-phenoxyacetic acid be used, or if solutions of the ternary condensation product obtained from 1/10 mol of cyanuric chloride and 1/10 mol of aniline, 1/10 mol of 4-amino-4'-hydroxy-3'-carboxyazobenzene and 1/10 mol of 1-amino-8-hydroxynaphthalene-4:6-disulfonic acid or -2:4-disulfonic acid or solutions of the ternary condensation product obtained from 1/10 mol of cyanuric chloride with 1/10 mol of ammonia, 1/10 mol of 4-amino-4'-hydroxy-3'-carboxyazobenzene and 1/10 mol of 1-amino-8-hydroxynaphthalene-4-sulfonic acid be used as end components.

Example 2

15.3 parts of 4-amino-1-hydroxybenzene-2-carboxylic acid are dissolved in 25 parts by volume of concentrated hydrochloric acid and 200 parts of water and are diazotized with 7 parts of sodium nitrite. At 0° C., the resulting diazo solution is freed from excess of mineral acid by addition of sodium acetate, and then a solution of 23.5 parts of the sodium salt of 5-ethoxy-1-amino-2-phenoxyacetic acid in 300 parts of water is added. After some hours, the aminoazo compound has been formed as a violet precipitate. This is separated by filtering and redissolved in 400 parts of water and 25 parts of caustic soda solution of 40° Bé. The solution is cooled to 0° C. with ice and 7 parts of sodium nitrite are added. The diazo compound is obtained as a brown suspension by adding 45 parts of concentrated hydrochloric acid to the cooled solution. This is now allowed to run into a solution of the ternary condensation product obtained from 18 parts of cyanuric chloride, 34.1 parts of 1-amino-8-hydroxynaphthalene-3:6-disulfonic acid, 25.7 parts of 4-amino-4'-hydroxy-3'-carboxyazobenzene and 9.5 parts of aniline which has been made strongly alkaline with sodium carbonate. A green solution is formed from which the dyestuff is precipitated by addition of common salt to the warm solution.

When dried, the dyestuff, which is probable of the formula

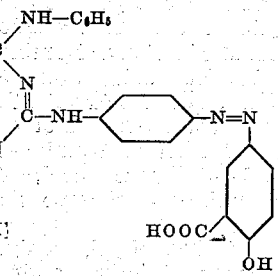

forms a black powder which dissolves in water and dilute soda solution to a blue-green solution and which gives a green solution in dilute caustic soda and concentrated sulfuric acid.

When it is dyed on cotton or regenerated cellulose rayon from a Glauber's salt bath, blue-green shades are obtained which become green on after treating with copper salts and are then fast to light and washing.

Dyestuffs which yield similar green shades fast to light and washing when their dyeings on vegetable fibres are aftertreated with copper salts are obtained if the 15.3 parts of 4-amino-1-hydroxybenzene-2-carboxylic acid be replaced as starting components by 16.7 parts of 6-methyl-4-amino-1-hydroxy-benzene-2-carboxylic acid, of 18.9 parts of 6-chloro-4-amino-1-hydroxybenzene-2-carboxylic acid, or if in place of 23.5 parts of the sodium salt of 1-amino-5-ethoxy-2-phenoxyacetic acid as middle component 20.5 parts of the sodium salt of 1-amino-5-methyl-2-phenoxyacetic acid be used, or if, as end component, a solution of the ternary condensation product obtained from 18 parts of cyanuric chloride, 34.1 parts of 1-amino-8-hydroxy-naphthalene-3:6-disulfonic acid, 27.1 parts of 4-amino-5'-methyl-4'-hydroxy-3'-carboxyazobenzene and 9.5 parts of aniline or a solution of the ternary condensation product obtained from 18 parts of cyanuric chloride, 34.1 parts of 1-amino-8-hydroxy-naphthalene-3:6-disulfonic acid, 29.2 parts of 4-amino-5'-chloro-4'-hydroxy-3'-carboxyazobenzene and 9.5 parts of aniline be used.

*Example 3*

A dyebath is prepared containing 2500 parts of water, 2 parts of the dyestuff obtained in Example 1 and 2 parts of anhydrous sodium carbonate. 100 parts of cotton, which have already been wetted-out, are entered into this bath at 50° C., and the temperature is raised in 15 minutes to 80–90° C., whereupon 30 parts of crystalline sodium sulfate are added, and dyeing is continued at about 90° C. for a further ¾ hour. The cotton is then rinsed and is after-coppered with a solution containing 3 parts of crystalline copper sulfate and 1 part of acetic acid of 40% strength in 2500 parts of water at 80° C. for ½ hour.

The cotton is dyed a fast shade of green.

What I claim is:

1. Process for the manufacture of polyazo dyestuffs, comprising coupling a diazotized aminoazo-dyestuff having as starting component a para-aminosalicylic acid and as middle component a compound of the general formula

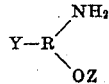

wherein R represents a benzene radical in which the substituents Y and OZ are placed in para position to one another and the amino group stands in ortho-position to OZ, and wherein Z represents the radical of a low aliphatic fatty acid which is united to the O-atom by means of a chain carbon atom, wherein further Y represents a member of the group consisting of alkyl, O-alkyl and O-aralyl groups, with an aminonaphthol sulfonic acid linked to a 1:3:5-triazine radical by means of its nitrogen atom, the said triazine radical being further linked to at least one radical of a para-aminoazo dyestuff and containing in the remaining place a radical selected from the group consisting of substituted and unsubstituted amino groups.

2. Process for the manufacture of polyazo dyestuffs, comprising coupling a diazotized aminoazo-dyestuff having as starting component a para-aminosalicylic acid and as middle component a compound of the general formula

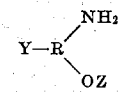

wherein R represents a benzene radical in which the substituents Y and OZ are placed in para position to one another and the amino group stands in ortho-position to OZ, and wherein Z represents the radical of a low aliphatic fatty acid which is united to the O-atom by means of a chain carbon atom, wherein further Y represents a member of the group consisting of alkyl, O-alkyl and O-aralkyl groups, with an aminonaphthol sulfonic acid linked to a 1:3:5-triazine radical by means of its nitrogen atom, the said triazine radical being further linked to at least one radical of a para-aminoazo-dyestuff containing a para-amino-salicylic acid as first component, said triazine radical containing in the remaining place a radical of an aromatic amine linked by means of its nitrogen atom.

3. Process for the manufacture of polyazo dyestuffs, comprising coupling a diazotized aminoazo-dyestuff having as starting component a para-aminosalicylic acid and as middle component a compound of the general formula

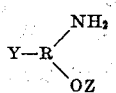

wherein R represents a benzene radical in which the substituents Y and OZ are placed in para position to one another and the amino group stands in ortho-position to OZ, and wherein Z represents the group —$CH_2$—COOH, wherein further Y represents a member of the group consisting of alkyl, O-alkyl and O-aralkyl groups, with an aminonaphthol sulfonic acid linked to a 1:3:5-triazine radical by means of its nitrogen atom, the said triazine radical being further linked to at least one radical of a para-aminoazo-dyestuff containing a para-aminosalicylic acid as first component, said triazine radical containing in the remaining place a radical of an aromatic amine linked by means of its nitrogen atom.

4. Process for the manufacture of polyazo dyestuffs, comprising coupling a diazotized aminoazo-dyestuff obtained from diazotized 4-amino-1-hydroxybenzene-2-carboxylic acid and 5-methoxy-1-amino-2-phenoxyacetic acid with the ternary condensation product from 1 mol cyanuric chloride and 1 mol each of 1-amino-8-hydroxynaphthalene-3:6-disulfonic acid, 4-amino-4'-hydroxy-3'-carboxyazobenzene and aniline.

5. Process for the manufacture of polyazo dyestuffs, comprising coupling a diazotized aminoazo-dyestuff obtained from diazotized 4-amino-1-hydroxybenzene-2-carboxylic acid and 5-ethoxy-1-amino-2-phenoxyacetic acid with the ternary condensation product from 1 mol cyanuric chloride and 1 mol each of 1-amino-8-hydroxynaphthalene-3:6-disulfonic acid, 4-amino-4'-hydroxy-3'-carboxyazobenzene and aniline.

6. Polyazo dyestuffs of the general formula

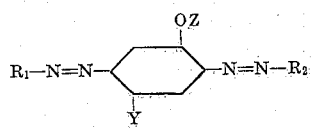

wherein $R_1$ represents the radical of a salicylic acid in which the OH-group stands in para position to the azo group, Y a member of the group consisting of an alkyl, an O-alkyl and an O-aralkyl group, Z the radical of a low aliphatic fatty acid which is united to the O-atom by means of a chain carbon atom, and $R_2$ the radical of an aminonaphthol sulfonic acid which is united to a 1:3:5-triazine radical by means of its nitrogen atom in the form of an imino group, the triazine radical containing at least once the radical of a para-aminoazo dyestuff as a substituent.

7. Polyazo dyestuffs of the general formula

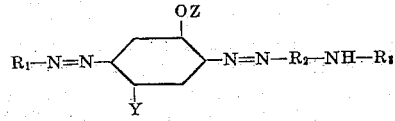

wherein $R_1$ represents the radical of a salicylic acid in which the OH-group stands in para-position to the azo-group, Y is a member of the group consisting of an alkyl, an O-alkyl and an O-aralkyl group, Z is the radical of a low aliphatic fatty acid which is united to the O-atom by means of a chain carbon atom, wherein further $R_2$ stands for the radical of a naphthol sulfonic acid, and finally $R_3$ stands for the radical of a ternary substituted 1:3:5-triazine with which also the other two substituents, of which at least one is the radical of a para-aminoazo dyestuff built up from a para-aminosalicylic acid and the remaining is an aromatic amine radical, are united by means of their nitrogen atoms in the form of imino groups.

8. Polyazo dyestuffs of the general formula

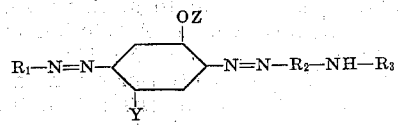

wherein $R_1$ represents the radical of a salicylic acid in which the OH-group stands in paraposition to the azo-group, Y is a member of the group consisting of an alkyl, an O-alkyl and an O-aralkyl group, Z stands for the group $$-CH_2-COOH,$$

wherein further $R_2$ stands for the radical of a naphthol sulfonic acid, and finally $R_3$ stands for the radical of a ternary substituted 1:3:5-triazine with which also the other two substituents, of which at least one is the radical of a para-aminoazo dye-stuff built up from a para-aminosalicylic acid and the remaining is an aniline radical, are united by means of their nitrogen atoms in the form of imino groups.

9. The trisazo dyestuff of the formula

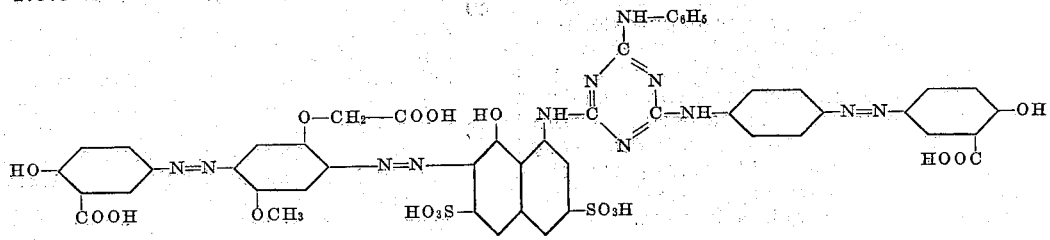

10. The trisazo dyestuff of the formula

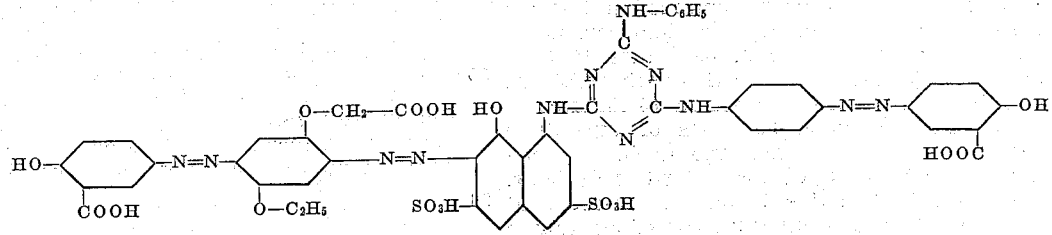

WALTER ANDERAU.

CERTIFICATE OF CORRECTION.

Patent No. 2,268,919. January 6, 1942.

WALTER ANDERAU.

It is hereby certified that error appears in the above numbered patent requiring correction as follows: In the heading to the printed specification, line 7, for "No. 337,317" read --Application May 25, 1940, Serial No. 337,317--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.